(12) United States Patent
Eastman (10) Patent No.: US 6,840,164 B2
(45) Date of Patent: Jan. 11, 2005

(54) CONVERTIBLE MARINADE CONTAINER/ DISPENSER HAVING A FLEXIBLY COMPRESSIBLE WALL, AND METHOD OF USING SAME

(75) Inventor: Brent Eastman, Clarkston, MI (US)

(73) Assignee: Eastman Outdoors, Inc., Flushing, MI (US)

( * ) Notice: Subject to any disclaimer, the term of this patent is extended or adjusted under 35 U.S.C. 154(b) by 72 days.

(21) Appl. No.: 10/062,318

(22) Filed: Jan. 31, 2002

(65) Prior Publication Data

US 2003/0143306 A1 Jul. 31, 2003

(51) Int. Cl.$^7$ .................................................. A23L 1/00
(52) U.S. Cl. ............................ 99/532; 99/345; 99/516
(58) Field of Search .................. 99/345–347, 532–536, 99/494, 485, 516; 141/25, 26, 21, 19, 1, 311 R, 369; 604/117, 208, 195, 216, 275, 911, 212, 215, 263; 220/666; 222/103, 107, 206, 575, 465.1, 464.1, 212, 215, 92, 95, 96, 106; D9/301; D25/115; 215/11.1, 11.6, 13.1

(56) References Cited

U.S. PATENT DOCUMENTS

| | | | |
|---|---|---|---|
| 687,790 A | * 12/1901 | Scales | 222/92 |
| 3,172,577 A | 3/1965 | Hartung | |
| 3,483,810 A | 12/1969 | Peters et al. | |
| 3,530,785 A | 9/1970 | Peters | |
| 3,557,788 A | 1/1971 | Swartz | |
| 3,754,469 A | * 8/1973 | Gasior | 99/532 |
| 3,762,307 A | * 10/1973 | Badovinac | 99/532 |
| 3,777,655 A | * 12/1973 | Ainsworth | 99/532 |
| 4,101,042 A | * 7/1978 | Strong et al. | 215/11.1 |
| 4,129,066 A | * 12/1978 | Corley | 99/345 |
| 4,294,168 A | * 10/1981 | Redhead | 99/494 |
| 4,327,782 A | 5/1982 | McKibben et al. | |
| 4,411,656 A | 10/1983 | Cornett | |
| 4,414,885 A | * 11/1983 | Kelly | 99/494 |
| D286,856 S | 11/1986 | Anscomb | |
| 4,753,638 A | 6/1988 | Peters | |
| 5,250,026 A | * 10/1993 | Ehrlich et al. | 604/60 |
| 5,333,761 A | 8/1994 | Davis et al. | |
| 5,553,745 A | 9/1996 | McMillian | |
| 5,605,093 A | * 2/1997 | Higashimoto | 99/533 |
| 5,934,187 A | * 8/1999 | Leon | 99/516 |
| 6,117,467 A | * 9/2000 | Huling | 426/281 |
| 6,244,308 B1 | * 6/2001 | Bignon et al. | 141/26 |
| 6,575,204 B1 | * 6/2003 | Godfrey et al. | 141/26 |
| 6,578,470 B2 | * 6/2003 | Backus et al. | 99/345 |

\* cited by examiner

Primary Examiner—Timothy Simone
(74) Attorney, Agent, or Firm—Carrier, Blackman & Associates, P.C.; William D. Blackman; Joseph P. Carrier (57) ABSTRACT

A container for holding and dispensing a marinade includes a container body, a cap, and a nozzle. The container body includes a compressible accordion-pleated wall. The cap attaches to the container body, and may include a removable central disc. The nozzle is provided for cooperating with the container body to transfer a marinade into a comestible workpiece. A user may break the removable central disc out of the cap to form an opening therein, place the nozzle below the cap and push a nozzle tube upwardly through the cap opening, and may then attach the cap to the container body such that the nozzle tube extends outwardly therefrom. A method of marinating a comestible workpiece includes steps of inserting a container nozzle into an opening formed in the workpiece, and compressing the container to shorten an accordion-pleated wall portion thereof, thereby injecting a marinade into the workpiece.

10 Claims, 6 Drawing Sheets

CONVERTIBLE MARINADE CONTAINER/DISPENSER HAVING A FLEXIBLY COMPRESSIBLE WALL, AND METHOD OF USING SAME

BACKGROUND OF THE INVENTION

1. Field of the Invention

The present invention relates to a convertible dual function container/dispenser for storing and dispensing a marinade, and to a method of using the container/dispenser to inject marinade into a comestible workpiece. More particularly, the present hive on relates to a convertible container/dispenser which is easily transformed from a storage configuration to a dispensing configuration. Even more particularly, the present invention relates to a convertible container/dispenser having a flexibly compressible wall, which can be flexibly compressed to force marinade outwardly from the container, and to a method of injecting a marinade into a comestible workpiece, using the described container.

2. Description of the Background Art

Marinades are used in the cooking and food preparation arts to infuse flavors and seasonings into a foodstuff before cooking. Marinades are primarily used with meats, fish and poultry. It has been known that foodstuffs can be immersed in a marinade before cooking. It has also been a known practice to inject a liquid marinade into an interior portion of a foodstuff with a specialized marinade injector, such as the type disclosed in U.S. Pat. No. 3,483,810 or 3,530,785.

However, the use of this type of known marinade injector normally involves each of the following necessary steps.

1. Obtain or make up a liquid marinade.

2. Check the specialized injector to ensure internal and external cleanliness, and clean if necessary.

3. Transfer the marinade from the vessel in which it is initially stored into the specialized injector to fill the specialized injector with the liquid marinade.

4. Clean up any spillage, as required.

5. Clean any tools (funnels, etc.) used in the transfer operation, as appropriate.

6. Inject the marinade into the food product, as needed.

7. Clean the specialized injector in preparation for its next use.

8. Store the specialized injector until needed again.

It will be observed that the above sequence of steps is relatively complicated and involved, and that it requires a number of cleaning operations.

A number of different containers are known for storing and/or for dispensing fluids.

U.S. Pat. No. Des.286,856, issued in 1986 discloses a bottle having a substantially cylindrical shape, and including collapsible accordion-type side walls.

U.S. Pat. No. 3,483,810 discloses a marinade injector which resembles a medical syringe, with a needle at one end and a plunger extension at the other end. The device of this reference includes a cylindrical body with smooth sides.

U.S. Pat. No. 3,530,785 discloses another marinade dispenser having a cylindrical body with smooth sides, and inside the dispenser body, a movable plunger is attached to a needle, and the needle and plunger move together when pressure is applied to the body.

U.S. Pat. No. 3,557,788 discloses a compressible plastic container having accordion-type walls, with an injector nozzle housed within the container. The injector nozzle may be extended out and threadably attached to the top of the container when it is ready for use. The side walls of the container may be collapsibly compressed to expel fluid from the container out of the injector nozzle.

U.S. Pat. No. 5,553,745 discloses a collapsible bottle for holding a carbonated beverage. The container of this reference includes an accordion-pleated wall section.

Other devices having accordion-pleated walls are known, as illustrated by U.S. Pat. Nos. 3,172,577, 4,327,782, 4,411,656, 4,753,638, and 5,333,761.

Although the known devices have some utility for their intended purposes, a need still exists in the art for an dual-function storage and dispenser bottle, for use in both storing and dispensing liquid marinades. A need further exists in the art for an improved method of injecting a marinade from a storage container into a comestible workpiece.

SUMMARY OF THE INVENTION

The present invention provides a dual-function vessel which is useable for both storing and dispensing a marinade. The vessel hereof may store a liquid marinade in a sealed and protected condition, and when ready to use, the vessel may be adapted, in a few simple steps, to convert it into a dispenser for injecting a liquid marinade into a food product. Since the container is relatively inexpensive, it may simply be discarded after use, without the necessity of cleaning and storing it.

A storage/dispenser vessel according to the invention includes a container body, a cap, and a nozzle. The container body includes a flexibly compressible wall portion. In a preferred embodiment, the container body includes an accordion-pleated wall portion.

The cap is provided for attaching to the container body with the nozzle base trapped between the cap and the container body. Preferably, the cap has an upper surface with a removable central portion, which is preferably disc-shaped.

The nozzle is provided for attaching to the container body, and for transferring a marinade from the container into a meat workpiece or other comestible workpiece.

A user may break the removable central portion out of the cap to form an opening therein, may place the nozzle extending upwardly below the cap, and push a nozzle tube outwardly through the opening, and may then attach the cap to the container body such that the nozzle tube extends outwardly therefrom.

Then, a tip portion may be cut off of the nozzle, the nozzle may be inserted into an opening formed in a comestible workpiece, and the container body may be flexibly compressed to inject the liquid marinade outwardly from the nozzle and in the food product.

Accordingly, it is an object of the present invention to provide a method and apparatus for storing and dispensing a marinade.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
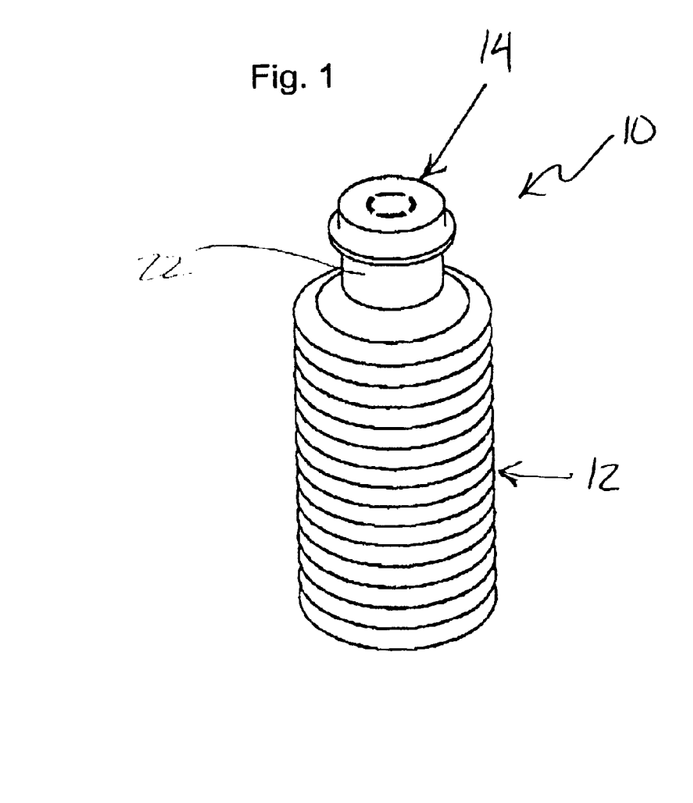
FIG. 1 is a perspective view of a compressible storage container in accordance with the present invention, shown in a storage configuration thereof.
Figure 2:
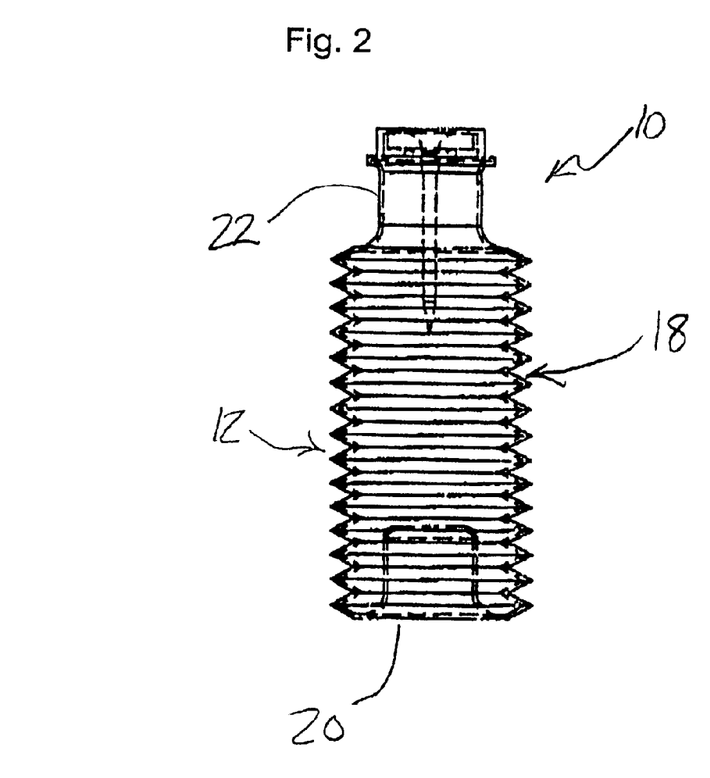
FIG. 2 is a side plan view of the container of FIG. 1, with a nozzle shown in phantom within the container.
Figure 3:
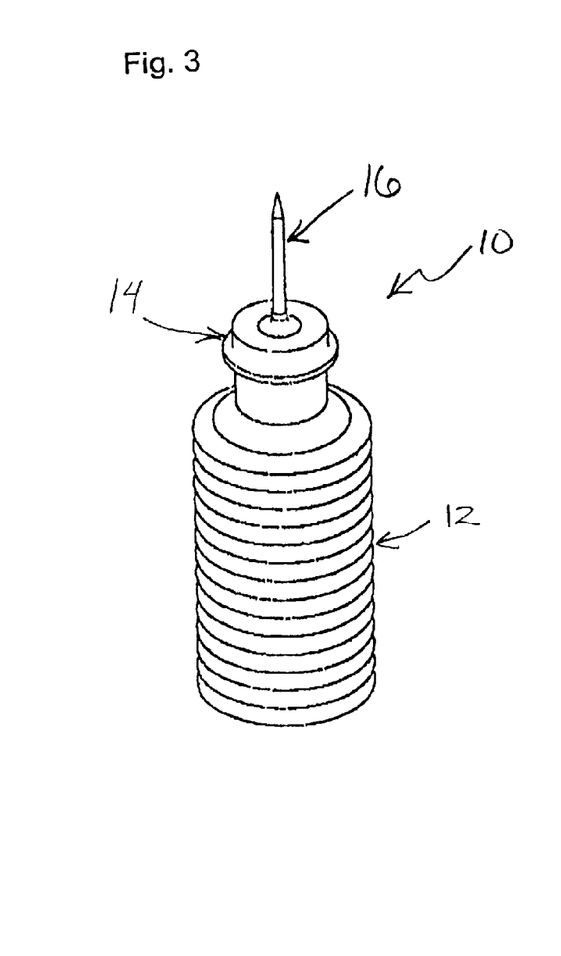
FIG. 3 is a perspective view of the compressible storage container of FIG. 1, shown in a dispensing configuration thereof.
Figure 4:
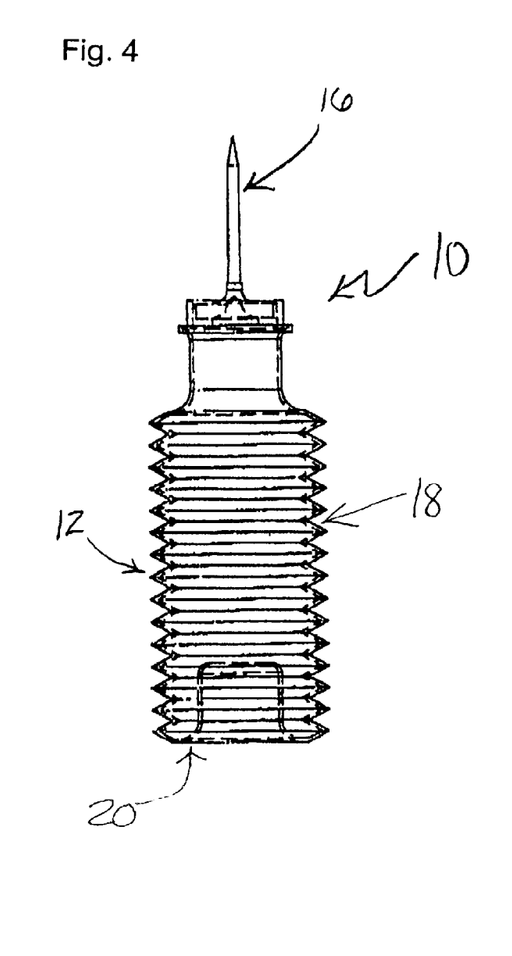
FIG. 4 is a side plan view of the container of FIG. 3, with a nozzle shown extending outwardly from the top of the container.
Figure 5:
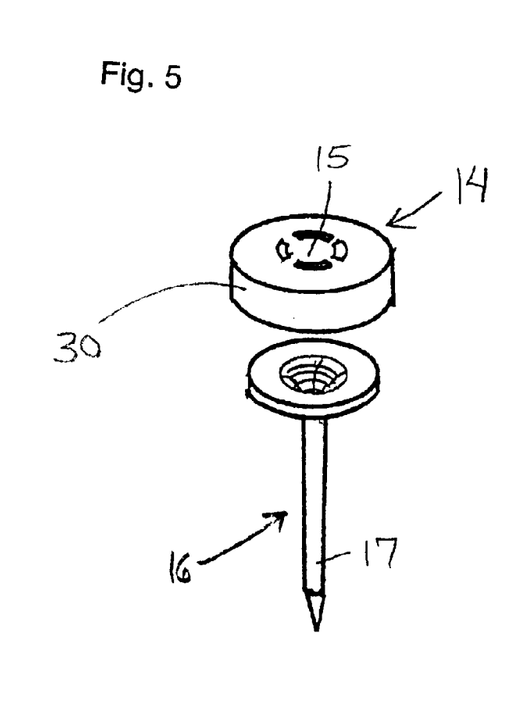
FIG. 5 is a detail perspective view of a cap and nozzle, which are components of the container of FIG. 1, shown in the storage configuration.

Referring now to FIGS. 1–9 of the drawings, a combination container/dispenser, for holding and dispensing a marinade, according to a first embodiment of the present invention, is shown generally at 10. The container 10 includes a container body 12, a cap 14, and a nozzle 16 (FIGS. 3–5).

The container body 12 includes a flexibly compressible accordion-pleated wall 18. The container body 12 also includes a floor 20 at the bottom of the wall 18, and a neck 22 integrally attached to the top of the wall 18. The container body 12 defines a hollow reservoir therein, for holding and storing a liquid marinade.

The container body 12 is preferably made of a flexibly resilient plastic material, which may be polyethylene, polypropylene, a copolymer of one of these, or another flexible plastic material known in the art.

Figure 7:
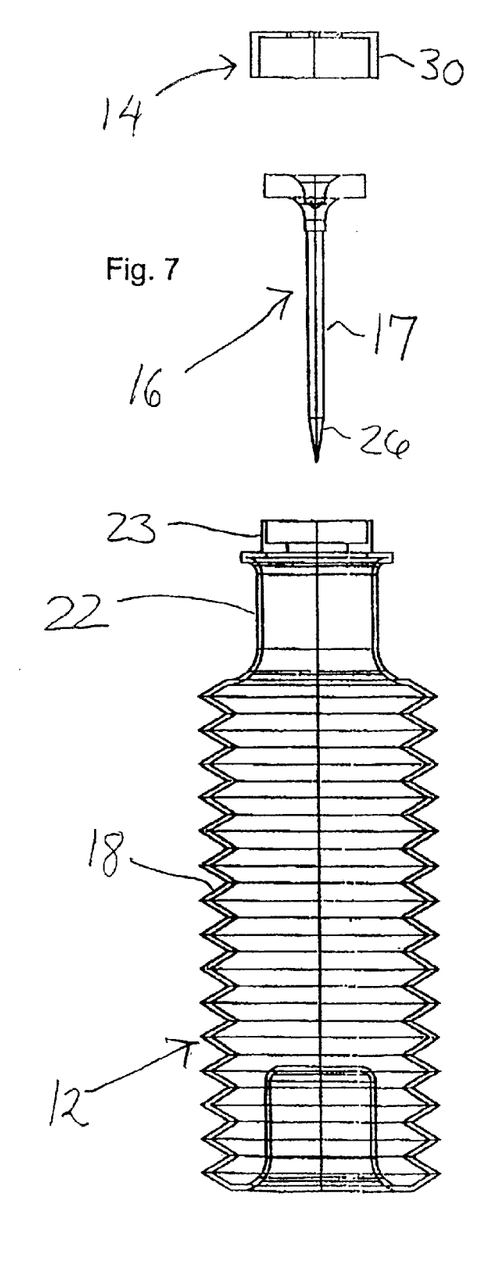
FIG. 7 is an exploded cross-sectional view of the container of FIG. 1, with the components thereof shown in the storage configuration.
Figure 8:
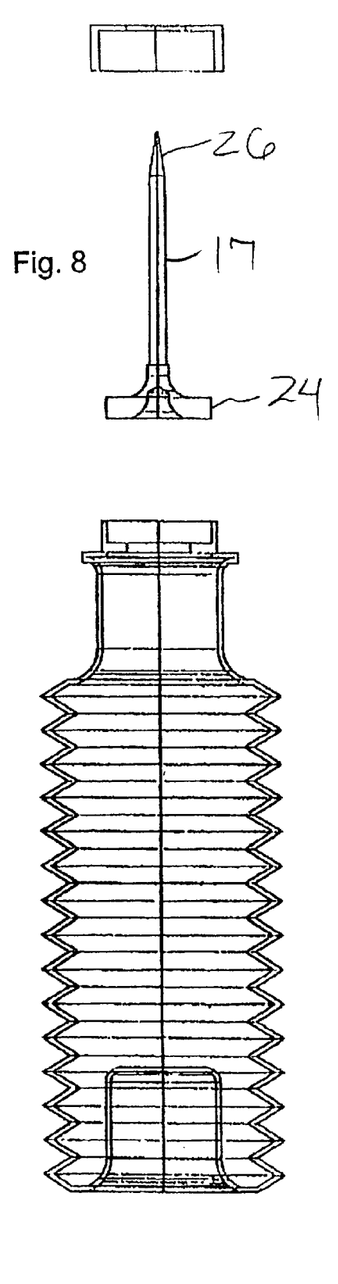
FIG. 8 is an exploded cross-sectional view of the container of FIG. 1, with the components thereof shown in the dispensing configuration.

The cap 14 is provided for attaching to the container body 12, and for retaining the nozzle 16 in association with the container body. The cap 14 fits sealingly onto the neck 22, and may be internally threaded, or may snap-fit thereon. Preferably, the cap 14 has a flattened upper surface with a removable central portion 15, which is preferably disc-shaped. The removable central portion 15, where used, is provided to facilitate transformation of the container/dispenser 10 from the storage orientation to the dispensing orientation thereof. The cap may include an annular band 30, integrally attached to and extending downwardly from the cap upper surface. The annular band 30 is preferred to have threads formed internally therein, which are threadably engageable with corresponding external threads on uppermost section 23 of the container neck 22 (FIG. 7).

The nozzle 16 is provided for attaching to the container body 12, and for transferring a liquid marinade from the container into a comestible workpiece, such as a meat roast, chicken or turkey.

Figure 6:
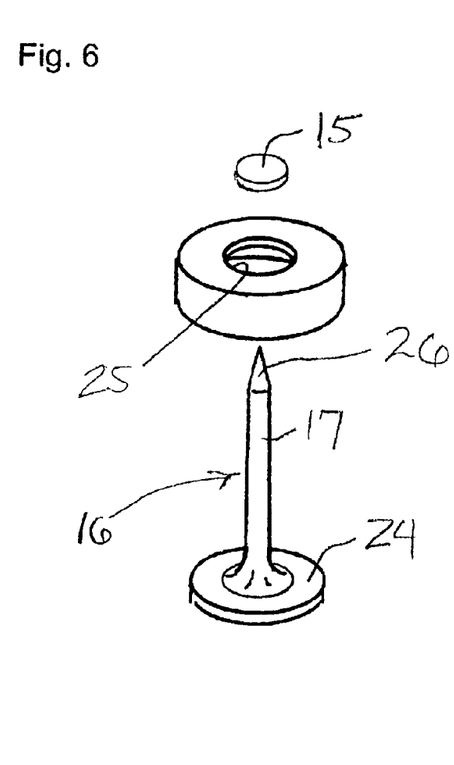
FIG. 6 is another detail perspective view of the cap and nozzle, shown in the dispensing configuration and also showing a plug which has been removed from the cap.

To convert the container/dispenser from the containing to the dispensing mode, the cap 14 is first removed from the container body 12. The removable central portion 15 is then broken out of the cap 14 to form a central opening 25 therein. The nozzle 16 is then removed from the container body 12, inverted and placed extending upwardly below the cap, as shown in FIG. 6. The nozzle tube 17 is then pushed outwardly through the opening 25. The nozzle base 24 remains below the cap 14, since it is too large to pass through. The cap 14 is then re-attached to the container body 12 such that the nozzle tube 17 extends outwardly therefrom.

Figure 9:
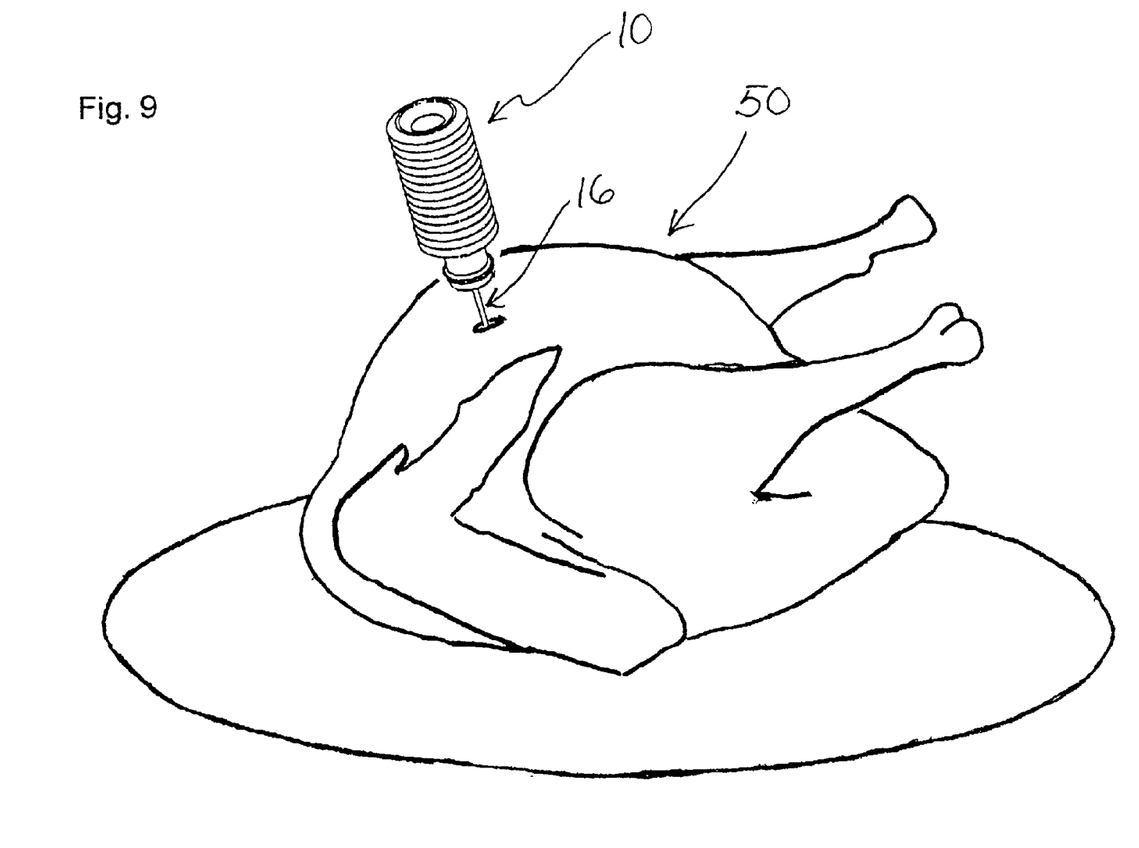
FIG. 9 is a perspective view of the compressible storage container of FIGS. 1–4, shown with the nozzle thereof inserted into a meat workpiece and preparing to inject a marinade therein.

Then, a tip portion 26 is cut off the nozzle 16, the nozzle is inserted into an opening formed in a food product, such as the chicken 50 illustrated in FIG. 9, and the container body 12 is flexibly compressed to inject the liquid marinade outwardly from the container/dispenser 10 and into the food product.

Figure 10:
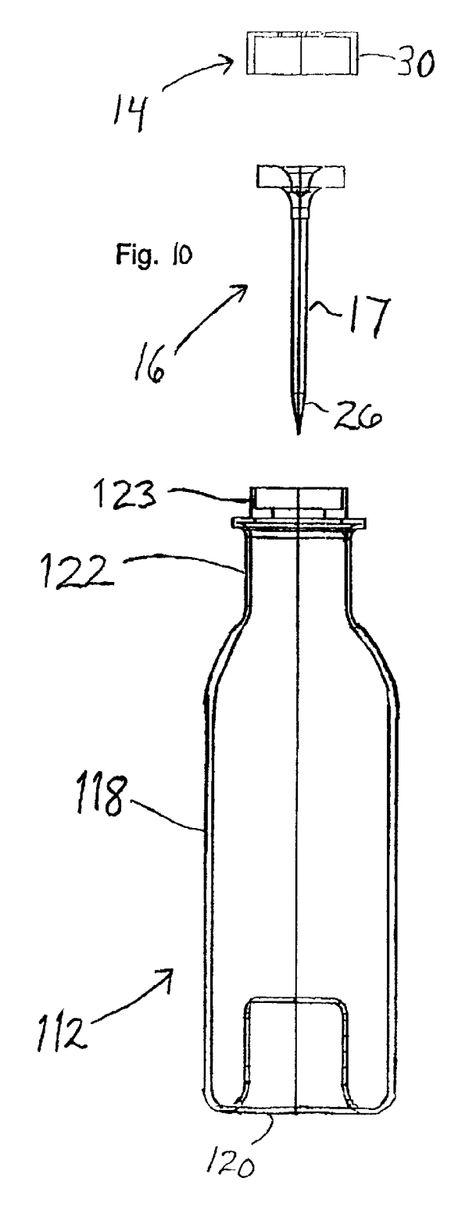
FIG. 10 is an exploded cross-sectional view of a flexibly compressible marinade container according to a second embodiment of the invention, with the components thereof shown in a storage configuration.
Figure 11:
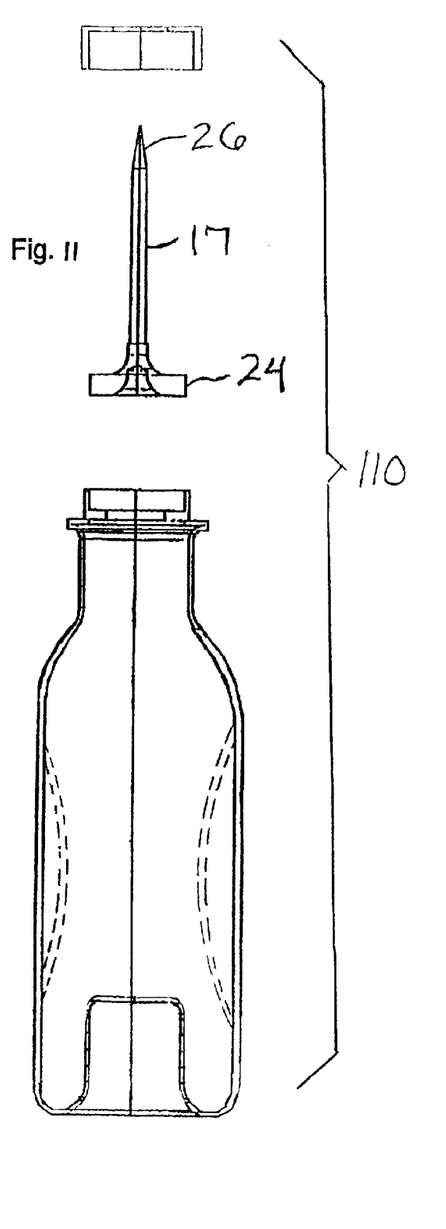
FIG. 11 is an exploded cross-sectional view of the container of FIG. 10, with the components thereof shown in the dispensing configuration, and also showing, in phantom, a compressed position of the container body wall.

Referring now to FIGS. 10–11, a combination container/dispenser, for holding and dispensing a marinade, according to a second embodiment of the present invention, is shown generally at 110. The container 110 includes a container body 112, a cap 14, and a nozzle 16.

The cap 14 and nozzle 16 are the same as those previously discussed in connection with the first embodiment, and shown in FIGS. 5–6.

The container body 112 includes a flexibly compressible wall 118. The container body 112 also includes a floor 120 at the bottom of the wall 118, and a neck 122 integrally attached to the top of the wall 118. The container body 112 defines a hollow reservoir therein, for holding and storing a liquid marinade.

The container body 112 is preferably made of a flexibly resilient plastic material, which may be polyethylene, polypropylene, a copolymer of one of these, or another flexible plastic material known in the art.

In order to prepare for injecting marinade into a comestible workpiece using the container 110 of FIG. 11, the cap 14 is first removed from the container body 112. The removable central portion 15 is then broken out of the cap 14 to form a central opening 25 therein. The nozzle 16 is then removed from the container body 112, inverted and placed extending upwardly below the cap, as shown in FIG. 6. The nozzle tube 17 is then pushed outwardly through the opening 25. The nozzle base 24 remains below the cap 14, since it is too large to pass through. The cap 14 is then re-attached to the container body 112 such that the nozzle tube 17 extends outwardly therefrom.

Then, a tip portion 26 is cut off the nozzle 16, the nozzle is inserted into an opening formed in a food product which is a comestible workpiece, such as the chicken 50 illustrated in FIG. 9.

Marinade is ejected from the container shown in FIGS. 10–11 by compressing opposed areas of the container wall section 118 inwardly, towards the central axis of the container body, as shown by the phantom lines in FIG. 11. This forces liquid marinade outwardly from the nozzle tip and into the comestible workpiece.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A container for storing and dispensing a marinade, comprising:
   a container body, comprising:
      a base comprising a flexibly compressible wall portion; and
      a neck integrally attached to the base and having an opening formed therein;
   a cap for attaching to the container body, the cap having a removable central portion; and
   a nozzle for attaching to the neck portion of the container body, the nozzle comprising a nozzle base and a hollow nozzle tube attached to and extending outwardly from the nozzle base, the nozzle having sufficient strength and rigidity to be insertable into an opening formed in a comestible workpiece;
   whereby a user may remove the removable central portion from the cap to form an opening therein, may place the nozzle below the cap and push the nozzle tube outwardly through the opening, and may then attach the cap to the container body such that the nozzle tube extends outwardly therefrom.

2. The container of claim 1, wherein the container body comprises an accordion-pleated wall portion.

3. The container of claim 1, wherein the cap comprises an annular band attached to and extending downwardly from said cap upper surface, the annular band having threads formed therein which are threadably engageable with corresponding threads on the container body.

4. The container of claim 1, wherein the removable central portion is an integrally formed part of the cap.

5. The container of claim 1, wherein the nozzle comprises a conical tip portion.

6. The container of claim 1, wherein the nozzle comprises a sealed tip portion adapted to be cut off by a user at a time when contents of the container are to be used.

7. A container for storing and dispensing a marinade, comprising:
   a container body, comprising:
      a base comprising a closed lower end, a wall portion extending longitudinally upward from the closed lower end, the wall portion being longitudinally flexibly collapsible; and a neck integrally attached the upper end of the wall portion, the neck having an opening formed therein;
   a cap for attaching to the container body, the cap having a removable central portion; and
   a nozzle for attaching to the neck portion of the container body, the nozzle comprising a nozzle base and a hollow tubular body attached to and extending outwardly from the nozzle base, the nozzle having sufficient strength and rigidity to be insertable into an opening formed in a comestible workpiece;
   whereby a user may remove the removable central portion from the cap form an opening therein, may place the projecting tube below the cap and push the projecting tube outwardly through the opening, and may then attach the cap to the container body such that the projecting tube extends outwardly therefrom.

8. The container for storing and dispensing a marinade of claim 7, wherein the wall portion comprises accordion-pleats to allow longitudinal compression thereof.

9. The container for storing and dispensing a marinade of claim 7 wherein the projecting tube terminates at a closed sutbstantially pointed tip.

10. The container of claim 7, wherein the cap comprises an annular band integral with and extending downwardly from a closed upper end,
   the annular band having threads formed therein which are threadably engageable with corresponding threads on the container body, and
   the closed upper end comprising an integrally formed disc and comprising a circular depression scored on an upper side thereof that surrounds the central portion of the disc, said scored circular depression provided to facilitate removal of the central portion.

* * * * *

UNITED STATES PATENT AND TRADEMARK OFFICE
CERTIFICATE OF CORRECTION

PATENT NO. : 6,840,164 B2
DATED : January 11, 2005
INVENTOR(S) : Eastman

It is certified that error appears in the above-identified patent and that said Letters Patent is hereby corrected as shown below:

Title page, illustrating figure(s) should be deleted, and substituted therefore, the title page illustrating figure(s). (attached)

Delete drawing sheets 1-6, and substitute therefore drawing sheets 1-6. (attached)

Column 1,
Line 13, change "hive on" to -- invention --.

Signed and Sealed this

Seventeenth Day of May, 2005

JON W. DUDAS
*Director of the United States Patent and Trademark Office*

(12) United States Patent
Eastman (10) Patent No.: US 6,840,164 B2
(45) Date of Patent: Jan. 11, 2005

(54) CONVERTIBLE MARINADE CONTAINER/ DISPENSER HAVING A FLEXIBLY COMPRESSIBLE WALL, AND METHOD OF USING SAME

(75) Inventor: Brent Eastman, Clarkston, MI (US)

(73) Assignee: Eastman Outdoors, Inc., Flushing, MI (US)

( * ) Notice: Subject to any disclaimer, the term of this patent is extended or adjusted under 35 U.S.C. 154(b) by 72 days.

(21) Appl. No.: 10/062,318

(22) Filed: Jan. 31, 2002

(65) Prior Publication Data

US 2003/0143306 A1 Jul. 31, 2003

(51) Int. Cl.[7] ................................................. A23L 1/00
(52) U.S. Cl. ......................... 99/532; 99/345; 99/516
(58) Field of Search ................. 99/345–347, 532–536, 99/494, 485, 516; 141/25, 26, 21, 19, 1, 311 R, 369; 604/117, 208, 195, 216, 275, 911, 212, 215, 263; 220/666; 222/103, 107, 206, 575, 465.1, 464.1, 212, 215, 92, 95, 96, 106; D9/301; D25/115; 215/11.1, 11.6, 13.1

(56) References Cited

U.S. PATENT DOCUMENTS

| | | | |
|---|---|---|---|
| 687,790 A | * 12/1901 | Scales | 222/92 |
| 3,172,577 A | 3/1965 | Hartung | |
| 3,483,810 A | 12/1969 | Peters et al. | |
| 3,530,785 A | 9/1970 | Peters | |
| 3,557,788 A | 1/1971 | Swartz | |
| 3,754,469 A | * 8/1973 | Gasior | 99/532 |
| 3,762,307 A | * 10/1973 | Badovinac | 99/532 |
| 3,777,655 A | * 12/1973 | Ainsworth | 99/532 |
| 4,101,042 A | * 7/1978 | Strong et al. | 215/11.1 |
| 4,129,066 A | * 12/1978 | Corley | 99/345 |
| 4,294,168 A | * 10/1981 | Redhead | 99/494 |
| 4,327,782 A | 5/1982 | McKibben et al. | |
| 4,411,656 A | 10/1983 | Cornett | |
| 4,414,885 A | * 11/1983 | Kelly | 99/494 |
| D286,856 S | 11/1986 | Anscomb | |
| 4,753,638 A | 6/1988 | Peters | |
| 5,250,026 A | * 10/1993 | Ehrlich et al. | 604/60 |
| 5,333,761 A | 8/1994 | Davis et al. | |
| 5,553,745 A | 9/1996 | McMillian | |
| 5,605,093 A | * 2/1997 | Higashimoto | 99/533 |
| 5,934,187 A | * 8/1999 | Leon | 99/516 |
| 6,117,467 A | * 9/2000 | Huling | 426/281 |
| 6,244,308 B1 | * 6/2001 | Bignon et al. | 141/26 |
| 6,575,204 B1 | * 6/2003 | Godfrey et al. | 141/26 |
| 6,578,470 B2 | * 6/2003 | Backus et al. | 99/345 |

* cited by examiner

Primary Examiner—Timothy Simone
(74) Attorney, Agent, or Firm—Carrier, Blackman & Associates, P.C.; William D. Blackman; Joseph P. Carrier (57) ABSTRACT

A container for holding and dispensing a marinade includes a container body, a cap, and a nozzle. The container body includes a compressible accordion-pleated wall. The cap attaches to the container body, and may include a removable central disc. The nozzle is provided for cooperating with the container body to transfer a marinade into a comestible workpiece. A user may break the removable central disc out of the cap to form an opening therein, place the nozzle below the cap and push a nozzle tube upwardly through the cap opening, and may then attach the cap to the container body such that the nozzle tube extends outwardly therefrom. A method of marinating a comestible workpiece includes steps of inserting a container nozzle into an opening formed in the workpiece, and compressing the container to shorten an accordion-pleated wall portion thereof, thereby injecting a marinade into the workpiece.

10 Claims, 6 Drawing Sheets